US012783966B2

(12) United States Patent
Ryland et al.

(10) Patent No.: US 12,783,966 B2
(45) Date of Patent: Nov. 3, 2026

(54) MACHINE LEARNING MODEL GRAFTING AND INTEGRATION

(71) Applicant: Raytheon Company, Waltham, MA (US)

(72) Inventors: James W. Ryland, Dallas, TX (US); Jonathan H. Goldstein, Fredericksburg, VA (US)

(73) Assignee: Raytheon Company, Arlington, VA (US)

( * ) Notice: Subject to any disclaimer, the term of this patent is extended or adjusted under 35 U.S.C. 154(b) by 774 days.

(21) Appl. No.: 18/305,034

(22) Filed: Apr. 21, 2023

(65) Prior Publication Data

US 2024/0354662 A1 Oct. 24, 2024

(51) Int. Cl.
*G06N 20/20* (2019.01)

(52) U.S. Cl.
CPC .................................... *G06N 20/20* (2019.01)

(58) Field of Classification Search
CPC ...................................................... G06N 20/20
See application file for complete search history.

(56) References Cited

U.S. PATENT DOCUMENTS 11,475,372 B2 10/2022 Candel et al.
2022/0076136 A1 3/2022 Passban et al.
2022/0398405 A1* 12/2022 Hassan ................ G06V 20/597

OTHER PUBLICATIONS

Yosinski, J., Clune, J., Bengio, Y., & Lipson, H. (Nov. 2014). How transferable are features in deep neural networks?. arXiv preprint arXiv:1411.1792. (Year: 2014).*
Heller, G., Perrin, E., Vrabie, V., Dusart, C., & Le Roux, S. (Jan. 2022). Grafting heterogeneous neural networks for a hierarchical object classification. IEEE Access, 10, 12927-12940. (Year: 2022).*
Peng, L., Hu, R., Kong, F., Gan, J., Mo, Y., Shi, X., & Zhu, X. (Apr. 2022). Reverse graph learning for graph neural network. IEEE transactions on neural networks and learning systems, 35(4), 4530-4541. (Year: 2022).*
McNeely-White et al., "Inception and ResNet features are (almost) equivalent," Cognitive Systems Research, vol. 59, Jan. 2020, 7 pages.
McNeely-White, "Same Data, Same Features: Modern Imagenet-Trained Convolutional Neural Networks Learn the Same Thing," Thesis, Department of Computer Science at Colorado State University, 2020, 48 pages.

(Continued)

*Primary Examiner* — Michael J Huntley
*Assistant Examiner* — Maggie Thanh Maido

(57) ABSTRACT

A method includes obtaining multiple machine learning models, where each machine learning model includes a backbone and a head. The method also includes selecting a first of the machine learning models to retain its backbone. The method further includes back-propagating error terms for synthetic activation data through at least a portion of the backbone of a second of the machine learning models to generate an inception basis set. In addition, the method includes configuring a bridge using the inception basis set, where the bridge is configured to translate features generated by the backbone of the first machine learning model into features for use by the head of the second machine learning model.

20 Claims, 6 Drawing Sheets

(56) References Cited

OTHER PUBLICATIONS

McNeely-White et al., "Canonical Face Embeddings," IEEE Transactions on Biometrics, Behavior, and Identity Science, Apr. 2021, 13 pages.
Donahue et al., "Long-term Recurrent Convolutional Networks for Visual Recognition and Description," Electrical Engineering and Computer Sciences, University of California at Berkeley, Nov. 2014, 13 pages.
Taylor, "Efficient Deep Neural Network Inference for Embedded Systems: A Mixture of Experts Approach," School of Computing and Communications, Lancaster University, Nov. 2020, 172 pages.
"Is there any way of feeding features from one CNN to another CNN?" Quora, 2019, 22 pages.
"How to pass features extracted using CNN into RNN?" Data Science Stack Exchange, Jul. 2017, 3 pages.
Marcelino, "Solve any Image Classification Problem Quickly and Easily," KDnuggets, 2018, 43 pages.

* cited by examiner

MACHINE LEARNING MODEL GRAFTING AND INTEGRATION

TECHNICAL FIELD

This disclosure relates generally to machine learning systems. More specifically, this disclosure relates to machine learning model grafting and integration.

BACKGROUND

Machine learning systems are being used more and more often to perform a wide variety of functions in computing and other electronic systems. An example of a typical machine learning model can include a backbone containing one or more layers that process input data to generate extracted features, as well as a head containing one or more layers that process the extracted features in order to generate outputs of the machine learning model. The machine learning model is configured during training so that the backbone learns which features from the input data are useful in performing a specific task or tasks and so that the head learns how to detect, classify, or otherwise process the extracted features in order to generate accurate outputs.

SUMMARY

This disclosure relates to machine learning model grafting and integration.

In a first embodiment, a method includes obtaining multiple machine learning models, where each machine learning model includes a backbone and a head. The method also includes selecting a first of the machine learning models to retain its backbone. The method further includes back-propagating error terms for synthetic activation data through at least a portion of the backbone of a second of the machine learning models to generate an inception basis set. In addition, the method includes configuring a bridge using the inception basis set, where the bridge is configured to translate features generated by the backbone of the first machine learning model into features for use by the head of the second machine learning model.

In a second embodiment, an apparatus includes at least one memory configured to store multiple machine learning models, where each machine learning model includes a backbone and a head. The apparatus also includes at least one processing device configured to select a first of the machine learning models to retain its backbone. The one processing device is also configured to back-propagate error terms for synthetic activation data through at least a portion of the backbone of a second of the machine learning models to generate an inception basis set. The one processing device is further configured to configure a bridge using the inception basis set. The bridge is configured to translate features generated by the backbone of the first machine learning model into features for use by the head of the second machine learning model.

In a third embodiment, a method includes obtaining a machine learning architecture having a backbone and a head of a first machine learning model, a bridge, and a head of a second machine learning model, where the machine learning architecture lacks a backbone of the second machine learning model. The method also includes providing input data to the backbone of the first machine learning model and generating extracted features based on the input data using the backbone of the first machine learning model. The method further includes processing the extracted features using the head of the first machine learning model. In addition, the method includes translating the extracted features using the bridge to generate translated features and processing the translated features using the head of the second machine learning model.

In a fourth embodiment, an apparatus includes at least one memory configured to store a machine learning architecture having a backbone and a head of a first machine learning model, a bridge, and a head of a second machine learning model, where the machine learning architecture lacks a backbone of the second machine learning model. The apparatus also includes at least one processing device configured to provide input data to the backbone of the first machine learning model. The at least one processing device is also configured to generate extracted features based on the input data using the backbone of the first machine learning model and process the extracted features using the head of the first machine learning model. The at least one processing device is further configured to translate the extracted features using the bridge to generate translated features and process the translated features using the head of the second machine learning model.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
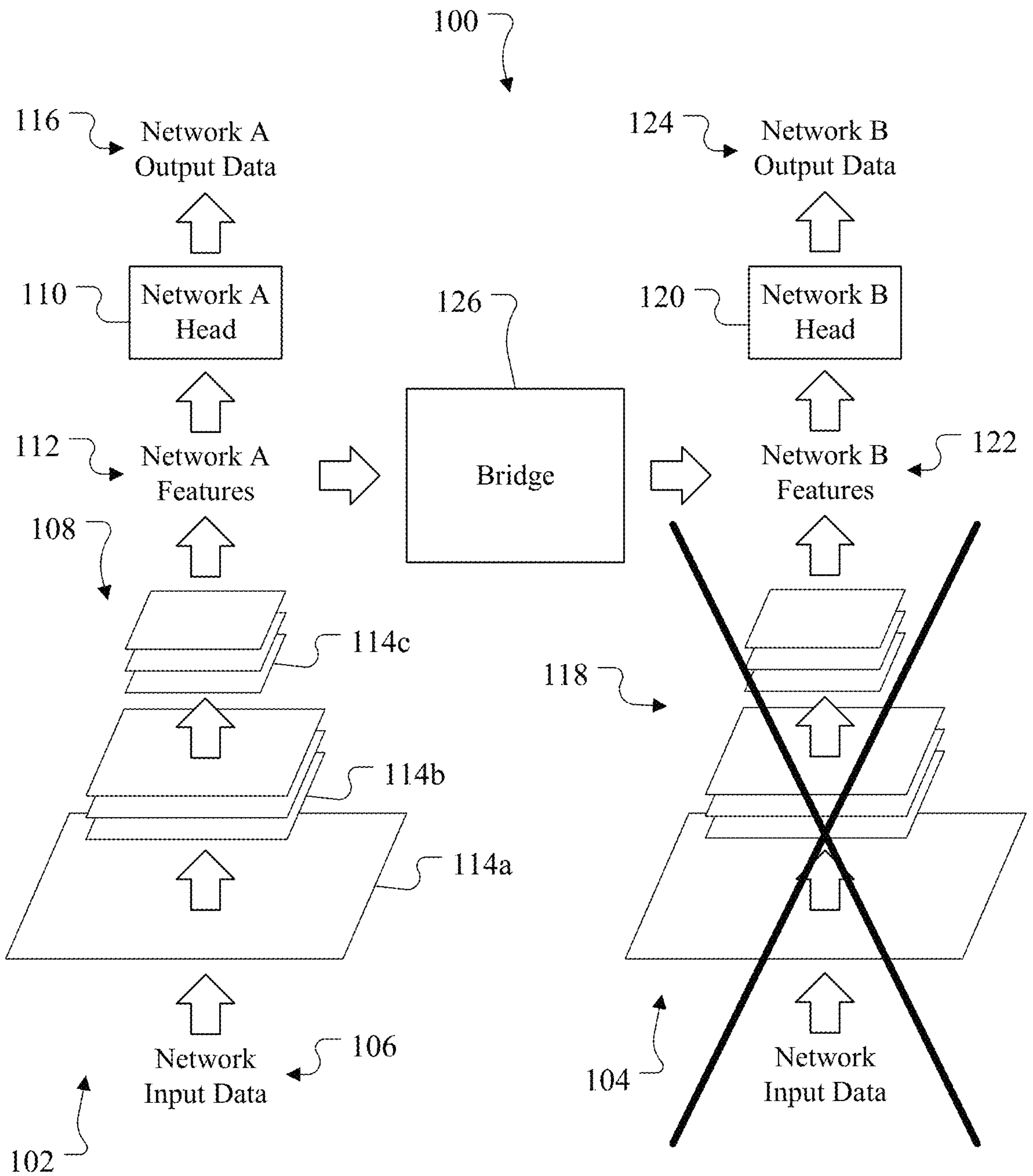
FIG. 1 illustrates an example architecture for machine learning model grafting and integration according to this disclosure.

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, machine learning systems are being used more and more often to perform a wide variety of functions in computing and other electronic systems. An example of a typical machine learning model can include a backbone containing one or more layers that process input data to generate extracted features, as well as a head containing one or more layers that process the extracted features in order to generate outputs of the machine learning model. The machine learning model is configured during training so that the backbone learns which features from the input data are useful in performing a specific task or tasks and so that the head learns how to detect, classify, or otherwise process the extracted features in order to generate accurate outputs.

Unfortunately, if multiple machine learning models are needed or desired in a machine learning system, the machine learning models are typically bundled into a package and executed in parallel by the machine learning system. As a result, each machine learning model processes input data using its own backbone and processes the resulting extracted features using its own head. While this approach is effective in some circumstances, it can be very inefficient and wasteful, such as in terms of processing and memory resources used. In some cases, these problems can actually prevent the usage of the machine learning models, such as by preventing usage of the machine learning models on devices that are more resource-constrained in terms of processing or memory resources that are available.

This disclosure provides various techniques for machine learning model grafting and integration. As described in more detail below, when multiple machine learning models are available for use, at least one machine learning model may be selected, and the backbone of each selected machine learning model may be retained. For each non-selected machine learning model, inception can be used to learn how high-level units of the backbone of the non-selected machine learning model respond to the environment. Using incepted knowledge, a bridge can be trained or otherwise configured to translate between (i) the extracted features produced using the backbone of the selected machine learning model and (ii) the extracted features expected by the head of the non-selected machine learning model. The backbone of the non-selected machine learning model may then be discarded or otherwise ignored, and the bridge may instead be provided and used to produce extracted features for processing by the head of the non-selected machine learning model. The machine learning models may be deployed for use by providing the backbone and the head of each selected machine learning model, along with one or more bridges and one or more heads of one or more non-selected machine learning models (but without the backbone(s) of the one or more non-selected machine learning models).

In this way, it is possible to deploy and use multiple machine learning models having reduced processing and memory requirements. For example, compared to each machine learning model using its own backbone and head, it may take significantly fewer processing and memory resources to generate extracted features using one or several backbones of one or several machine learning models and (where necessary) translate the extracted features for use by one or more heads of one or more other machine learning models. Among other things, this can enable reduced processing and memory usage by devices and achieve reduced power consumption by the devices. Also or alternatively, this may enable more machine learning models to be deployed for use by the devices. Moreover, in some instances, this can be achieved while obtaining equivalent or even improved results compared to parallel execution of independent machine learning models. For instance, an improvement in results may be obtained when the retained backbone of a first machine learning model is more effective at generating extracted features than the discarded backbone of a second machine learning model, which may occur due to various circumstances (such as due to better training of the first machine learning model or due to usage of better training data when training the first machine learning model).

Machine learning systems designed in accordance with this disclosure may be used in any suitable applications. For example, multiple machine learning models may be deployed and used together to perform multiple image processing functions using captured image data or to perform multiple audio processing functions using captured audio data. In general, machine learning systems designed in accordance with this disclosure may be used to process any suitable input data and generate any suitable machine learning-based output data using the input data. Also, in some cases, the same device may be used to graft and integrate multiple machine learning models and may even be used to generate the machine learning models. In other cases, one or more devices may be used to graft and integrate (and possibly generate) multiple machine learning models, which can be deployed to one or more other devices for use during inferencing operations or other operations. In general, this disclosure is not limited to any particular use of a single device or multiple devices to obtain, graft, integrate, and use machine learning models.

FIG. 1 illustrates an example architecture 100 for machine learning model grafting and integration according to this disclosure. As shown in FIG. 1, the architecture 100 generally includes two machine learning models 102 and 104, each of which may be referred to as a "network" and which are differentiated using "Network A" and "Network B" labels here. Each machine learning model 102 and 104 generally represents a machine learning algorithm that has been trained to process input data and generate output data based on the input data. Each machine learning model 102 and 104 may be trained to perform any suitable function or functions, such as at least one image processing task, audio processing task, or other task(s). In this example, each machine learning model 102 and 104 is configured to receive and process input data 106, which represents any suitable data to be processed by the machine learning model 102 and 104.

As shown in this example, the machine learning model 102 generally includes a backbone 108 and a head 110. The backbone 108 of the machine learning model 102 generally operates to process the input data 106 and generate extracted features 112 based on the input data 106. The extracted features 112 generally represent or are based on characteristics of the input data 106 that the machine learning model 102 has learned are relevant to the particular function or functions for which the machine learning model 102 has been trained to perform. As particular examples, the extracted features 112 may represent characteristics or information based on the characteristics of image data or audio data being processed.

The backbone 108 includes any suitable logic configured to generate extracted features 112 based on input data 106. For instance, the backbone 108 may include one or more convolution layers and associated pooling layers configured to process the input data 106 and generate appropriate extracted features 112, where each convolution layer is often associated with an activation function In this particular example, the backbone 108 of the machine learning model 102 includes various layers 114*a*-114*c*, each of which can receive the original input data 106 or the outputs of a preceding layer, process its inputs, and generate outputs for a subsequent layer or for output as the extracted features 112.

The head 110 of the machine learning model 102 generally operates to process the extracted features 112 in order to generate output data 116. For example, the head 110 of the machine learning model 102 may be trained to perform detection, classification, or other operations using the extracted features 112 in order to transform the extracted features 112 into one or more useful inferences. As particular examples, if the machine learning model 102 is trained to perform object recognition, the head 110 can process the extracted features 112 in order to generate probabilities or other predictions that certain types of objects are contained within image data. If the machine learning model 102 is trained to perform speaker recognition, the head 110 can process the extracted features 112 in order to generate probabilities or other predictions that certain speakers' voices are captured in audio data.

Any suitable machine learning model structure may be used by the machine learning model 102 here. Various architectures for the backbone 108 and the head 110 of a machine learning model are known in the art, and additional architectures for the backbone 108 and the head 110 of a machine learning model are sure to be developed in the future. For example, the machine learning model 102 may be implemented as a convolution neural network (CNN), a deep CNN, a deep neural network (DNN), a transformer-based network, a long short-term memory (LSTM) network, or any other suitable machine learning network. As particular examples, the backbone 108 and the head 110 of the machine learning model 102 may be implemented using a ResNet, Inception, or EfficientNet architecture. The specific architecture of the machine learning model 102 can vary as needed or desired, as long as the architecture of the machine learning model 102 can generally be divided into the backbone 108 and the head 110.

The machine learning model 104 similarly includes a backbone 118 and a head 120. The backbone 118 of the machine learning model 104 generally operates to process the input data 106 and generate extracted features 122 based on the input data 106. The extracted features 122 generally represent or are based on characteristics of the input data 106 that the machine learning model 104 has learned are relevant to the particular function or functions for which the machine learning model 104 has been trained to perform. As particular examples, the extracted features 122 may represent characteristics or information based on the characteristics of image data or audio data being processed.

The head 120 of the machine learning model 104 generally operates to process the extracted features 122 in order to generate output data 124. For example, the head 120 of the machine learning model 104 may be trained to perform detection, classification, or other operations using the extracted features 122 in order to transform the extracted features 122 into one or more useful inferences. As particular examples, if the machine learning model 104 is trained to perform object recognition, the head 120 can process the extracted features 122 in order to generate probabilities or other predictions that certain types of objects are contained within image data. If the machine learning model 104 is trained to perform speaker recognition, the head 120 can process the extracted features 122 in order to generate probabilities or other predictions that certain speakers' voices are captured in audio data.

Note that the backbone 118, the head 120, or both in the machine learning model 104 may or may not have a same or similar design as the backbone 108, the head 110, or both in the machine learning model 102. In other words, the machine learning models 102 and 104 may have a common architecture (where each instance of the architecture is trained differently to produce the machine learning models 102 and 104), or the machine learning models 102 and 104 may have different architectures.

Under normal circumstances, it is not possible to simply output the extracted features 112 generated by the backbone 108 of one machine learning model 102 for use by the head 120 of another machine learning model 104 (or vice versa). This is because the machine learning models 102 and 104 "speak" different "internal" languages due to their different trainings. That is, the machine learning models 102 and 104 learn their respective feature spaces differently, so the extracted features 112, 122 from the backbone 108, 118 of one machine learning model 102, 104 usually cannot be properly processed by the head 110, 120 of another machine learning model 102, 104.

As described in more detail below, a bridge 126 can be trained or otherwise configured and used to convert the extracted features 112 produced by the backbone 108 of the machine learning model 102 into corresponding features 122 for use by the head 120 of the machine learning model 104. Thus, the bridge 126 helps to compensate for the problems described above by translating the extracted features 112 generated by the backbone 108 of the machine learning model 102 (which has learned its associated feature space) into suitable features 122 for use by the head 120 of the machine learning model 104 (which is expecting features in its associated feature space). The bridge 126 effectively provides the ability to translate between the two feature spaces, thereby enabling the extracted features 112 from the machine learning model 102 to be used by both the head 110 of the machine learning model 102 and the head 120 of the machine learning model 104. The bridge 126 includes any suitable logic configured to translate extracted features. In some cases, the bridge 126 may include one or more machine learning model layers, such as one or more neural network layers. As particular examples, the bridge 126 may include one or more convolution layers or fully-connected layers, such as a nonlinear neural network layer or a series of nonlinear neural network layers.

Through the use of the bridge 126, the backbone 118 of the machine learning model 104 can actually be omitted and not deployed or otherwise used during inferencing or other operations. This means that one or more devices using the machine learning models 102 and 104 to process input data 106 need not use the backbone 118 of the machine learning model 104 when processing the input data 106, even though both machine learning models 102 and 104 are being used. In many instances, the backbone 108, 118 of a machine learning model 102, 104 is deeper and more powerful, while the head 110, 120 of the machine learning model 102, 104 is shallower and tends to involve fewer computations. Because of this, eliminating the use of the backbone 118 while still allowing both machine learning models 102, 104 to function properly and generate accurate output data 116, 124 can result in significant processing and memory usage reductions, which can also result in significant power consumption reductions by a device using the machine learning models 102 and 104.

One reason the illustrated approach described above is successful is that different machine learning models trained to perform related functions often learn similar feature spaces. For example, consider each neuron in a layer of a neural network as an axis in a high-dimensional space, where the reaction of the neurons in that layer to any stimulus is represented as a point in that high-dimensional space. At first glance, different neural networks may appear to organize stimuli in their high-level feature spaces in dissimilar manners. However, it can be shown that when those neural networks are exposed to similar environments (even if their training data is directed to different tasks), the neural networks are likely to learn similar feature spaces, including representations of things for which the neural networks are not explicitly trained. Often times, training samples with relevant features for the task(s) that the machine learning model 102 is trained to perform will also have features that are relevant for the task(s) that the machine learning model 104 is trained to perform. This can be particularly true when the backbone of one machine learning model generates adequately “rich” features that can be used by multiple machine learning models. Because of this, it can often be shown that the feature space learned by one neural network or other machine learning model is a rotated, scaled, mirrored, or otherwise transformed version of the feature space learned by another neural network or other machine learning model. This property allows the bridge 126 to convert the extracted features 112 generated by the backbone 108 of the machine learning model 102 into corresponding extracted features 122 that are suitable for use by the head 120 of the machine learning model 104, which can be done based on how the feature space of the machine learning model 104 is related to the feature space of the machine learning model 102 and which can be determined (at least in some cases) as described in more detail below.

Figure 2:
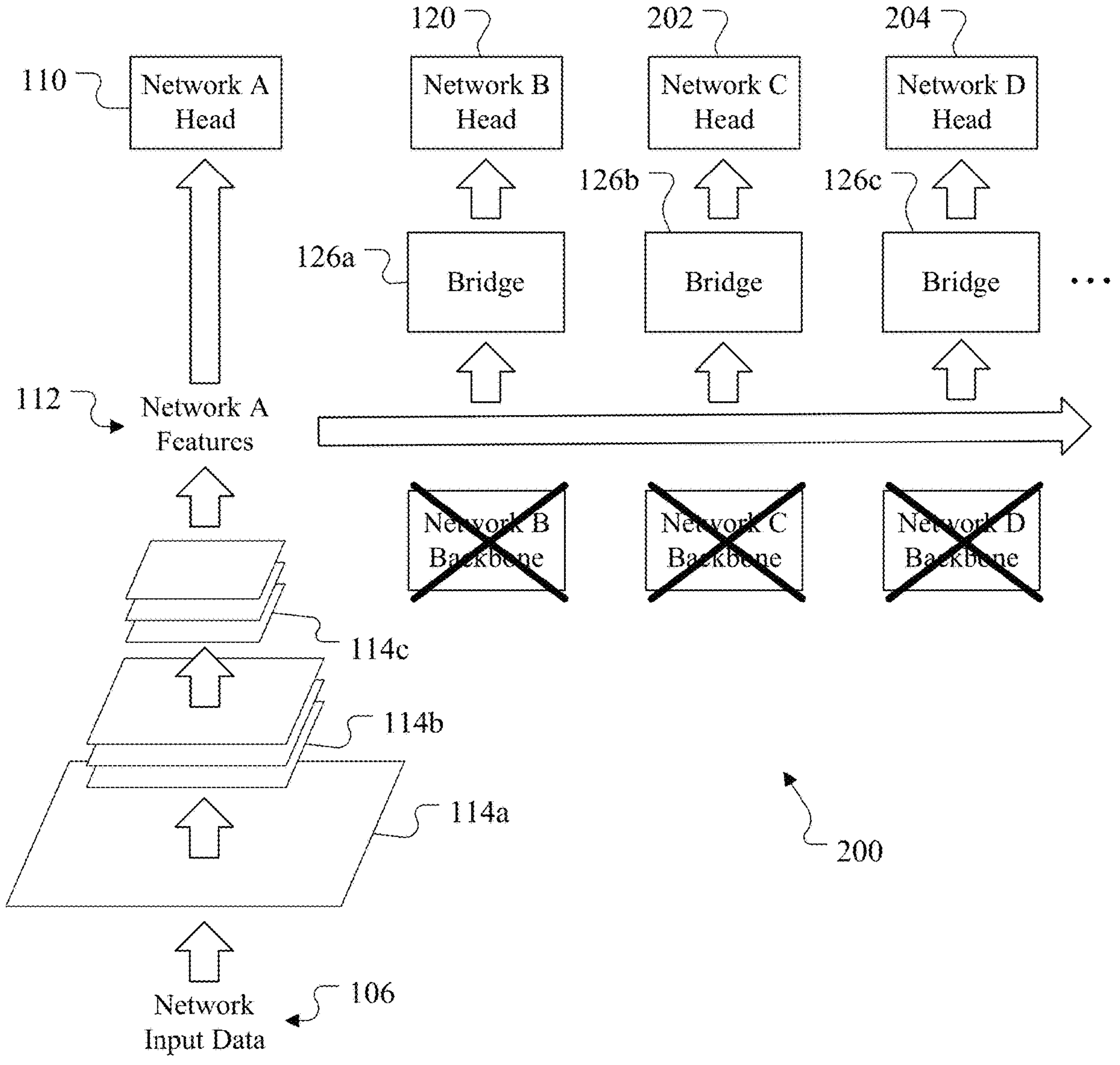
FIG. 2 illustrates an expanded example architecture for machine learning model grafting and integration according to this disclosure.

Note that the approach shown in FIG. 1 can be expanded as needed or desired. For example, FIG. 2 illustrates an expanded example architecture 200 for machine learning model grafting and integration according to this disclosure. As shown in FIG. 2, it is possible to use multiple bridges **126*a*-126*c* to support translation of the extracted features 112 from the backbone 108 of one machine learning model 102 for use by multiple heads 120, 202, 204 of multiple other machine learning models. In this example, the extracted features 112 from the backbone 108 of one machine learning model 102 are shown as being used by the heads 120, 202, 204 of three other machine learning models. However, this is for illustration only, and the extracted features 112 from the backbone 108 of the machine learning model 102 may be used by the heads of any desired number of machine learning models via any suitable number of bridges. Also, while it is assumed in FIG. 2 that the extracted features 112 from the backbone 108 of a single machine learning model 102** are being provided to the heads of multiple other machine learning models, other implementations may include multiple machine learning models that have retained their backbones. In those implementations, each of the machine learning models that has retained its backbone may provide its features (via one or more suitable bridges) to any suitable number of other machine learning models.

The ability to discard or otherwise not use the backbone (s) of one or more machine learning models can provide significant memory reductions and significant reductions in the number of computations performed when using the machine learning models. Moreover, as described below, knowledge can be discerned from the backbone(s) being discarded or otherwise not used via inception, which allows the bridge(s) 126, **126*a*-126*c* to be trained or otherwise configured appropriately even when the actual training data used to train the backbone(s) being discarded or otherwise not used is not available. This may be common in various circumstances, such as when third-party machine learning models are obtained and used to perform various functions in one or more machine learning systems. Note that the architectures 100, 200** are said to support machine learning model “grafting” and “integration” due to the ability to “graft” the head(s) of one or more machine learning models onto the backbone(s) of one or more other machine learning models, resulting in an integration of multiple machine learning models.

Although FIGS. 1 and 2 illustrate examples of architectures 100 and 200 for machine learning model grafting and integration, various changes may be made to FIGS. 1 and 2. For example, the specific structures of the machine learning models shown in FIGS. 1 and 2 are for illustration only and can vary as needed or desired. Also, any suitable number of bridges may be used to graft any suitable number of machine learning model heads onto any suitable number of other machine learning model backbones.

Figure 3:
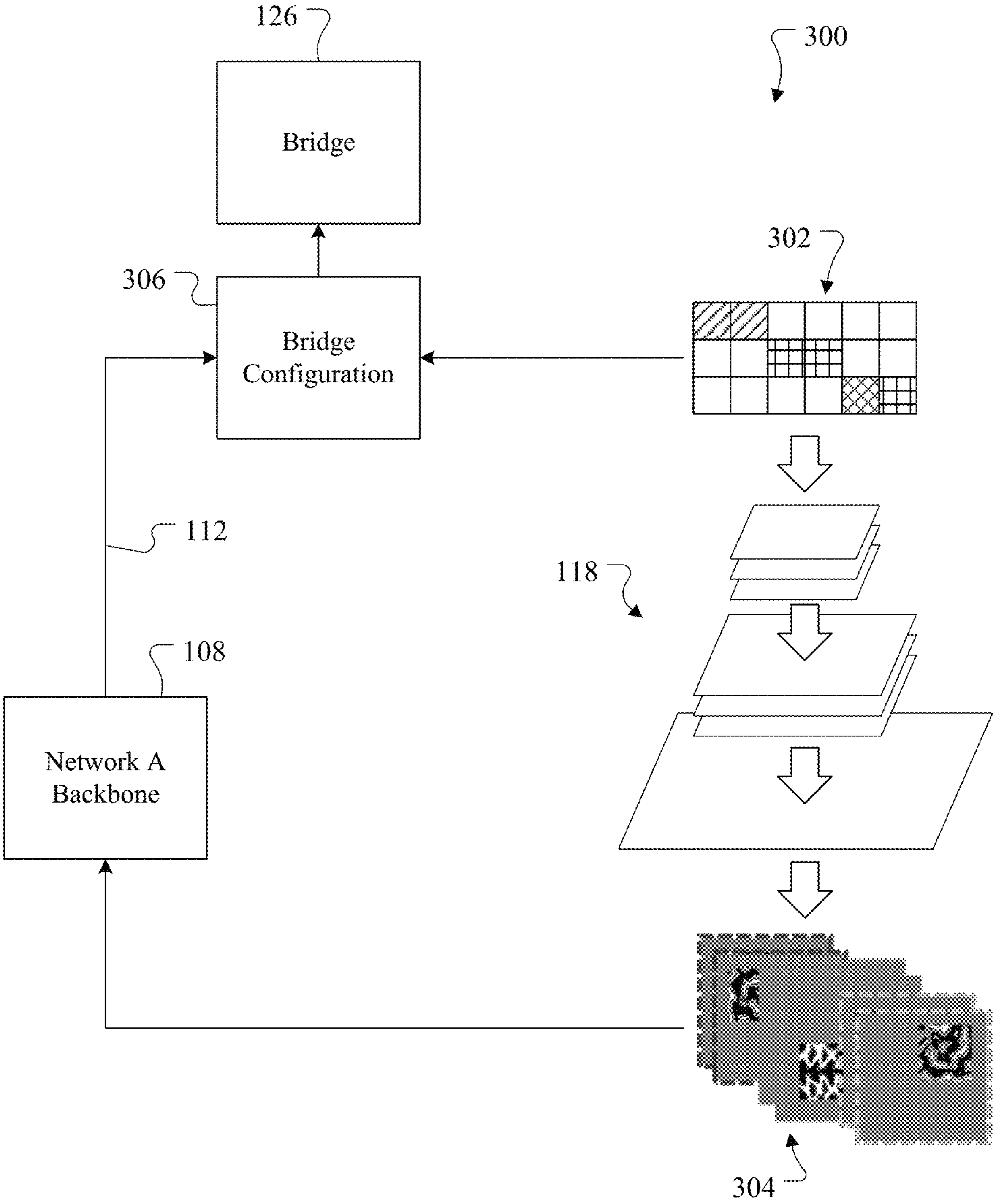
FIG. 3 illustrates an example process for generating a bridge to support machine learning model grafting and integration according to this disclosure.

FIG. 3 illustrates an example process 300 for generating a bridge to support machine learning model grafting and integration according to this disclosure. For ease of explanation, the process 300 shown in FIG. 3 is described as being used to generate the bridge 126 in the architecture 100 shown in FIG. 1. However, the process 300 shown in FIG. 3 may be used to generate any other suitable bridge(s) in any other suitable architecture(s), such as when the process 300 shown in FIG. 3 is used to generate each bridge **126*a*-126*c* in the architecture 200 shown in FIG. 2**.

As shown in FIG. 3, knowledge learned by the backbone 118 of the machine learning model 104 may be discerned using inception. Inception may be needed when the actual training data used to train the machine learning model 104 is not available. As noted above, for instance, this is typically common when third-party machine learning models are obtained and used to perform various functions in one or more machine learning systems, since the training data used to train a third-party machine learning model may itself be considered valuable or even a trade secret. Inception is a technique that uses back-propagation through the backbone 118 of the machine learning model 104 in order to learn how neurons/groups of neurons or other logic contained in the backbone 118 is stimulated. Inception therefore allows learning of how the logic contained in the backbone 118 responds and generates the extracted features 122.

In the example shown in FIG. 3, synthetic activation data 302 can be used and targeted at specific neurons/groups of neurons or other logic within the backbone 118. The synthetic activation data 302 is designed to determine how specific neurons/groups of neurons or other logic within the backbone 118 operate. Error terms for the synthetic activation data 302 are back-propagated through the backbone 118, resulting in the generation of an inception basis set (IBS) 304 by the backbone 118. For example, the synthetic activation data 302 (which will be the target activation for a layer of the backbone 118) may include identity vectors (vectors in which a single neuron is trying to be active), random activation vectors, or some combination thereof that is designed to tease out which patterns in the input space drive particular units of the backbone 118 using the inception process. Those patterns are compiled together to form an incepted basis set 304.

As an example of this, when performing back-propagation, an objective function is often used. In certain forms of machine learning, there is also an expected or target output to be produced by a machine learning model. In this case, an “error term” measures the difference between the expected output of a network or layer and the actual output of the network or layer. Here, the target output can represent a synthetic activity vector, and the difference between that and the actual output of the backbone 118 can be identified and used as the error term. The error terms can be back-propagated through the backbone 118, such as by using derivatives.

By doing this, it is possible to generate data that captures how one or more layers of the backbone 118 operate, and the inception basis set 304 essentially represents a re-encoding of the knowledge learned by the one or more layers of the backbone 118. Note that regularization of the synthetic activation data 302 provided to the backbone 118 can be used here in order to capture at least one suitable inception basis set 304. In some cases, one or more objective functions may be used to drive the backbone 118 in order to derive how individual neurons/groups of neurons or other logic within the backbone 118 behave. Also note that while the inception basis set 304 may not appear to be particularly interpretable by itself, the inception basis set 304 can be highly constraining for use in training one machine learning model to project to another machine learning model's feature space.

Once generated, the inception basis set 304 is used to train the bridge 126. For example, based on the inception basis set 304, the bridge 126 can be trained to map features 112 generated by the machine learning model 102 into features that would have been generated by the machine learning model 104. In this example, a bridge configuration function 306 can be used to train the bridge 126 using the inception basis set 304. Among other things, the bridge configuration function 306 can use the inception basis set 304 to derive how the backbone 118 of the machine learning model 104 would have generated the extracted features 122, and the bridge configuration function 306 can map extracted features 112 generated by the backbone 108 into corresponding extracted features 122 for use by the head 120. The bridge configuration function 306 can also configure the bridge 126 to support this mapping, such as by training the bridge 126 to support this mapping or by providing information defining this mapping to the bridge 126 for use. In this way, the bridge 126 can be configured to estimate what extracted features 122 might have been generated by the neurons or other logic of the backbone 118 based on the extracted features 112 that are actually generated by the backbone 108.

It is also possible to use the inception basis set 304 as training data for one or more layers of the backbone 108. For example, in some cases, back-propagation of error terms for target outputs of the inception basis set 304 may occur through only the top layer or the top few layers of the backbone 108. This may be done, for example, when the backbones 108 and 118 are trained using training data from similar environments. Even if the training data used to train the machine learning model 102 and the training data used to train the machine learning model 104 have different formats, it is likely that the machine learning models 102 and 104 learned similar feature spaces during their training due to the use of training data from similar environments. In these embodiments, the error terms for the target outputs of the inception basis set 304 may be provided only to the top layer or the top few layers of the backbone 108.

In other cases, back-propagation may occur through most or all layers of the backbone 108. This may be done, for instance, when the backbones 108 and 118 are trained using training data from dissimilar environments. In these embodiments, the error terms for the target outputs of the inception basis set 304 may be provided to most or all layers of the backbone 108. Among other things, this may help the backbone 108 learn to support features that the machine learning model 102 was not initially trained to include in the extracted features 112.

In still other cases, back-propagation may occur through most or all layers of the backbone 108. In addition, a gradient descent may be performed on the data being processed prior to each of at least some layers of the backbone 108. Among other things, this may help the backbone 108 learn a fusion of its own features (the features 112 used by the head 110 of the machine learning model 102) and the features 122 used by the head 120 of the machine learning model 104. This may be done, for example, when the backbones 108 and 118 are trained using highly dissimilar training data.

Note here that one or multiple inception basis sets 304 may be generated by the backbone 118 and used to create the bridge 126. Moreover, it is possible to expand this process 300 in order to generate inception basis sets 304 (in the same or similar manner as discussed above) for use in creating multiple bridges (such as the bridges 126*a*-126*c*). Thus, for example, one or more inception basis sets 304 can be generated by back-propagating error terms for the synthetic activation data 302 through the backbone of "Network B" in FIG. 2 to produce one or more first inception basis sets 304, and the first inception basis set(s) 304 can be used to create the bridge 126*a*. One or more other inception basis sets 304 can be generated by back-propagating more error terms for synthetic activation data 302 through the backbone of "Network C" in FIG. 2 to produce one or more second inception basis sets 304, and the second inception basis set(s) 304 can be used to create the bridge 126*b*. Still one or more other inception basis sets 304 can be generated by back-propagating more error terms for synthetic activation data 302 through the backbone of "Network D" in FIG. 2 to produce one or more third inception basis sets 304, and the third inception basis set(s) 304 can be used to create the bridge 126*c*.

As can be seen here, each inception basis set 304 can act as training data for the associated bridge 126, 126*a*-126*c* and optionally the backbone 108. There is no need for the actual training data used by the machine learning model 104 or other machine learning model to be available for use when creating the associated bridge 126, 126*a*-126*c*. This approach can therefore help to reduce or eliminate the need for obtaining and using training datasets when supporting the grafting and integration of different machine learning models. This approach can also help to solve the more general problem of transferring knowledge between machine learning models.

This type of approach can find use in various applications. For example, this type of approach may allow neural networks and other machine learning models to be used as building blocks, where the desired functions to be performed in a machine learning system can be identified and used to select machine learning models that are grafted and integrated into a suitable package. This can be done to support the creation of new functions without the need for using original or augmented training data. As other examples, this type of approach may be used to support new foundations for federated learning and network-of-networks learning, and this type of approach may be used to model biological systems. As yet another example, this type of approach may be used to support neural networks or other machine learning models teaching one another and learning to communicate with very little external assistance. Of course, these applications are examples only, and this type of approach may be used in any other suitable manner.

Although FIG. 3 illustrates one example of a process 300 for generating a bridge to support machine learning model grafting and integration, various changes may be made to FIG. 3. For example, any suitable amount of synthetic activation data 302 may be used to produce any suitable number of inception basis sets 304, and the inception basis sets 304 can be used to train any suitable number of bridges. Also, the bridge 126 may be trained or otherwise configured to perform feature mapping in any other suitable manner.

Figure 4:
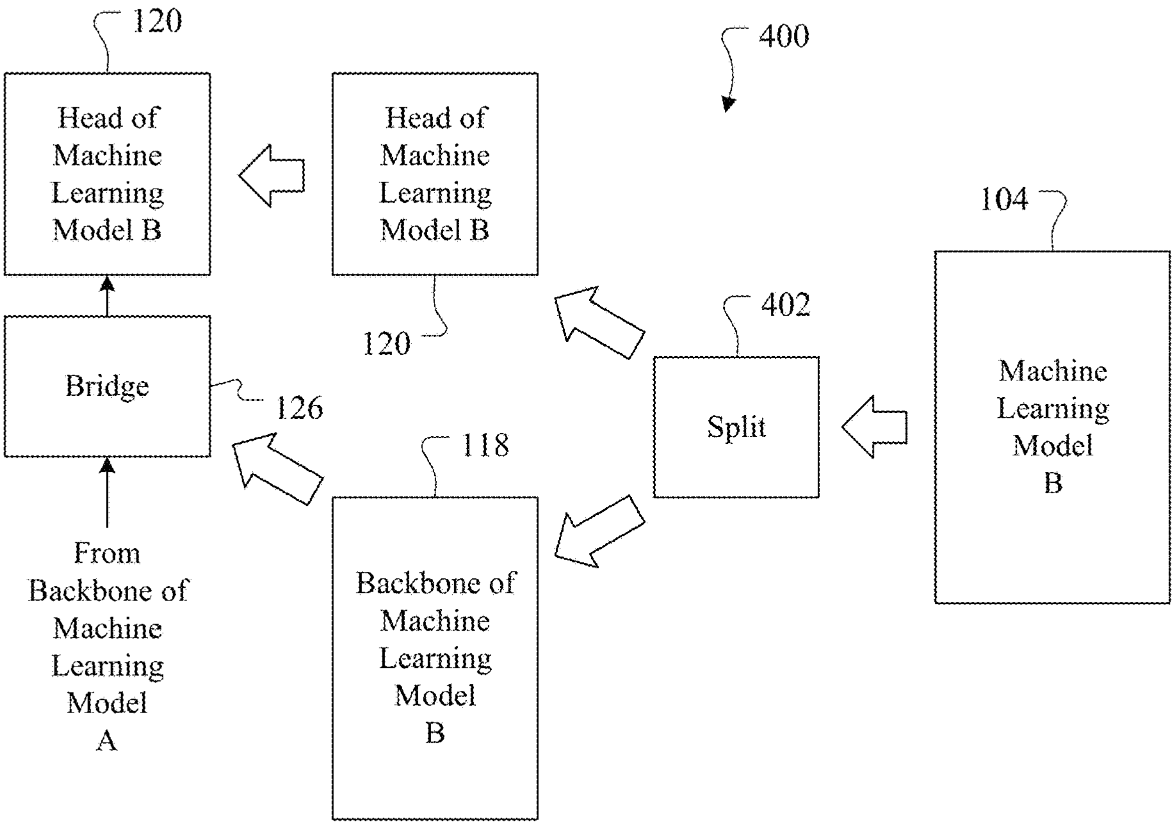
FIG. 4 illustrates an example process for machine learning model grafting and integration according to this disclosure.

FIG. 4 illustrates an example process 400 for machine learning model grafting and integration according to this disclosure. For ease of explanation, the process 400 shown in FIG. 4 is described as being used to graft the head 120 of the machine learning model 104 onto the machine learning model 102 in the architecture 100 shown in FIG. 1. However, the process 400 shown in FIG. 4 may be used to support the grafting and integration of any other or additional machine learning models into any other suitable architecture, such as when the process 400 shown in FIG. 4 is used to graft the heads 120, 202, 204 of multiple machine learning models onto the machine learning model 102 in the architecture 200 shown in FIG. 2.

As shown in FIG. 4, the machine learning model 104 can be processed using a split function 402, which splits the machine learning model 104 into its backbone 118 and its head 120. The split function 402 here can be performed based on knowledge of the architecture of the machine learning model 104, such as by splitting the machine learning model 104 into one portion (the backbone 118) that generates features and another portion (the head 120) that detects, classifies, or otherwise processes the features. The backbone 118 of the machine learning model 104 can be used to create a bridge 126 associated with the machine learning model 104. For instance, this may occur as shown in FIG. 3, where back-propagation of the error terms for the synthetic activation data 302 through the backbone 118 is used to produce inception basis set 304 and where the inception basis set 304 is used to train or otherwise configure the bridge 126. The resulting bridge 126 can be used with the head 120 of the machine learning model 104 in order to translate extracted features 112 from the backbone 108 of the machine learning model 102 for use by the head 120 of the machine learning model 104.

Although FIG. 4 illustrates one example of a process 400 for machine learning model grafting and integration, various changes may be made to FIG. 4. For example, the backbone 108 of the machine learning model 102 may be used with any other suitable number of heads in any other suitable number of other machine learning models via the configuration of any other suitable number of bridges.

Figure 5:
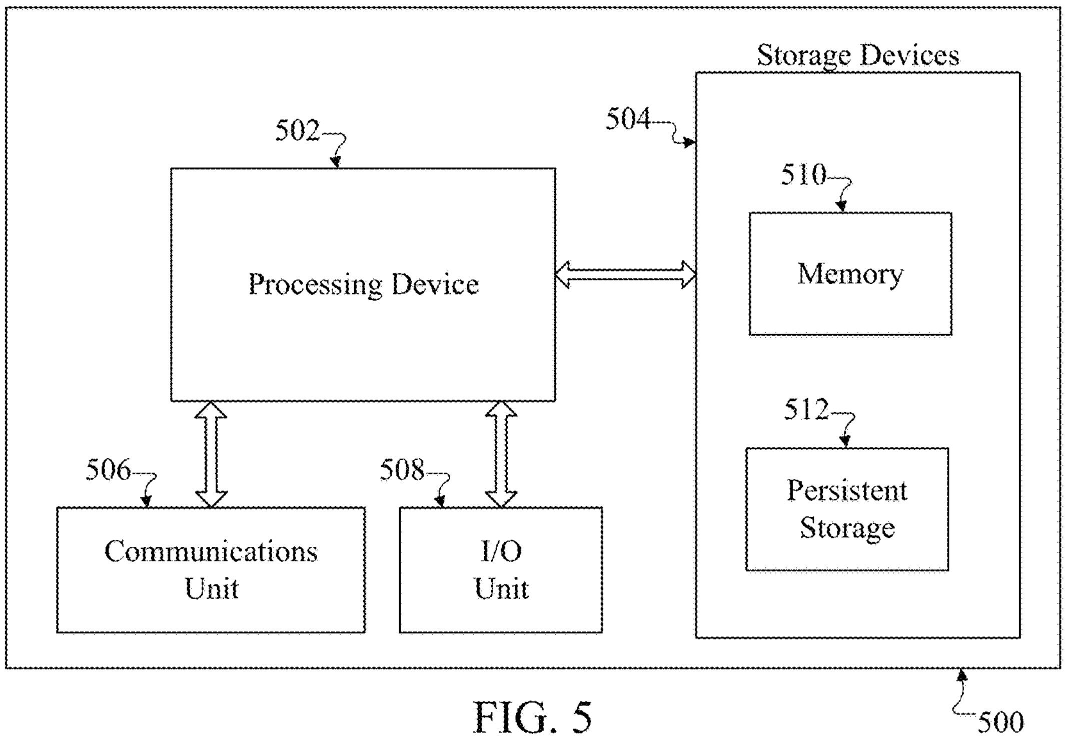
FIG. 5 illustrates an example device supporting machine learning model grafting and integration according to this disclosure.

FIG. 5 illustrates an example device 500 supporting machine learning model grafting and integration according to this disclosure. The device 500 may, for example, be used to graft and integrate multiple machine learning models (and possibly generate the machine learning models themselves). The device 500 may also or alternatively use multiple machine learning models to perform inferencing operations or other operations. As a particular example, one or more servers or other devices may graft and integrate (and possibly generate) multiple machine learning models, and the resulting models may be deployed to one or more end-user devices or other devices for actual use in analyzing data. Note, however, that the architectures and processes described above may be used with any other or additional device(s), such as when the one or more servers use the grafted and integrated machine learning models to perform inferencing or other operations.

As shown in FIG. 5, the device 500 denotes a computing device or system that includes at least one processing device 502, at least one storage device 504, at least one communications unit 506, and at least one input/output (I/O) unit 508. The processing device 502 may execute instructions that can be loaded into a memory 510. The processing device 502 includes any suitable number(s) and type(s) of processors or other processing devices in any suitable arrangement. Example types of processing devices 502 include one or more microprocessors, microcontrollers, digital signal processors (DSPs), application specific integrated circuits (ASICs), field programmable gate arrays (FPGAs), or discrete circuitry.

The memory 510 and a persistent storage 512 are examples of storage devices 504, which represent any structure(s) capable of storing and facilitating retrieval of information (such as data, program code, and/or other suitable information on a temporary or permanent basis). The memory 510 may represent a random access memory or any other suitable volatile or non-volatile storage device(s). The persistent storage 512 may contain one or more components or devices supporting longer-term storage of data, such as a read only memory, hard drive, Flash memory, or optical disc.

The communications unit 506 supports communications with other systems or devices. For example, the communications unit 506 can include a network interface card or a wireless transceiver facilitating communications over a wired or wireless network. The communications unit 506 may support communications through any suitable physical or wireless communication link(s).

The I/O unit 508 allows for input and output of data. For example, the I/O unit 508 may provide a connection for user input through a keyboard, mouse, keypad, touchscreen, or other suitable input device. The I/O unit 508 may also send output to a display, printer, or other suitable output device. Note, however, that the I/O unit 508 may be omitted if the device 500 does not require local I/O, such as when the device 500 represents a server or other device that can be accessed remotely.

In some embodiments, the instructions executed by the processing device 502 include instructions that implement the architectures and processes described above. Thus, in some devices, the instructions when executed may cause the processing device 502 to back-propagate the error terms for the synthetic activation data 302 through one or more backbones 118 of one or more machine learning models 104, generate one or more bridges 126, **126*a*-126*c* based on the resulting inception basis set(s) 304, and optionally package or otherwise collect one or more heads of those one or more machine learning models with one or more complete machine learning models that have retained their backbones and the one or more bridges 126, 126*a*-126*c*. The instructions when executed may also cause the processing device 502 to use the collection of grafted and integrated machine learning models or to deploy or otherwise provide the collection of grafted and integrated machine learning models to one or more other devices for use. In other devices, the instructions when executed may cause the processing device 502 to obtain a package or other collection of grafted and integrated machine learning models and to use the machine learning models, such as to process input data 106 and generate corresponding output data 116, 124. In still other devices, the instructions when executed may cause the processing device 502** to perform all of these functions.

Although FIG. 5 illustrates one example of a device 500 supporting machine learning model grafting and integration, various changes may be made to FIG. 5. For example, computing and communication devices and systems come in a wide variety of configurations, and FIG. 5 does not limit this disclosure to any particular computing or communication device or system.

Figure 6:
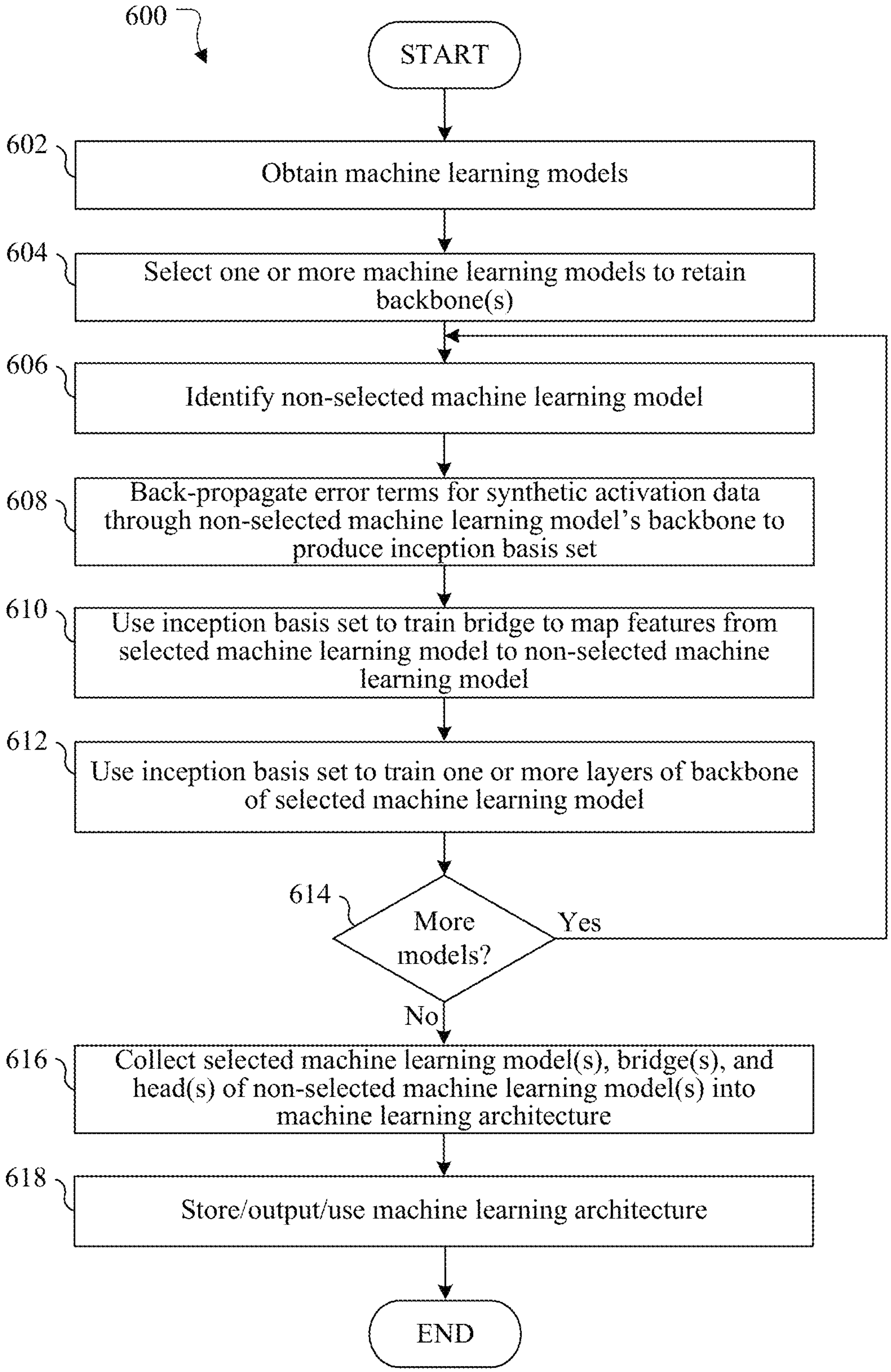
FIG. 6 illustrates an example method for machine learning model grafting and integration according to this disclosure.

FIG. 6 illustrates an example method 600 for machine learning model grafting and integration according to this disclosure. For ease of explanation, the method 600 is described as being performed using one or more instances of the device 500 shown in FIG. 5, which may use the processes 300 and 400 shown in FIGS. 3 and 4 to produce the architecture 100 or 200 shown in FIG. 1 or 2. However, the method 600 may be performed using any other suitable device(s), and the method 600 may involve the generation of any other suitable machine learning model architecture designed in accordance with this disclosure.

As shown in FIG. 6, multiple machine learning models are obtained at step 602. This may include, for example, the processing device 502 generating at least one of the machine learning models 102, 104, obtaining at least one of the machine learning models 102, 104 from an external memory or other source(s), or otherwise obtaining the machine learning models 102, 104. At least one of the machine learning models is selected to retain its or their backbone(s) at step 604. This may include, for example, the processing device 502 selecting at least one of the machine learning models (such as the machine learning model 102) to retain its backbone (such as the backbone 108). The processing device 502 may make this determination in any suitable manner, such as based on user input or by analyzing the backbones 108, 118 of the machine learning models 102, 104. In some instances, the machine learning model(s) may be selected randomly or based on which machine learning model or models appear to have a better-trained backbone or backbones.

A non-selected machine learning model is identified at step 606. This may include, for example, the processing device 502 identifying one of the machine learning models (such as the machine learning model 104) that was not selected to retain its backbone. Error terms for synthetic activation data is back-propagated through at least part of the backbone of the non-selected machine learning model at step 608. This may include, for example, the processing device 502 back-propagating the error terms for the synthetic activation data 302 through the backbone 118 of the machine learning model 104 in order to produce inception basis set 304. The inception basis set is used to train a bridge to map the features from the selected machine learning model for use by the non-selected machine learning model at step 610. This may include, for example, the processing device 502 performing the bridge configuration function 306 in order to train or otherwise configure a bridge 126, **126*a*-126*c* to perform a mapping between extracted features 112 that are produced by the backbone 108 of the selected machine learning model 102 and extracted features 122 that would be generated by the backbone 118 of the non-selected machine learning model 104 based on the inception basis set 304. The mapping can be used to map features from the feature space of the machine learning model 102 into the feature space of the machine learning model 104. Optionally, error terms for target outputs for the inception basis set 304 may be back-propagated through one or more layers of the backbone of the selected machine learning model at step 612**.

A determination is made whether at least one additional non-selected machine learning model needs to be processed at step 614. If so, the process returns to step 606 to identify another non-selected machine learning model and generate a bridge for the non-selected machine learning model. Otherwise, the selected machine learning model(s), the bridge(s), and the head(s) of the non-selected machine learning model(s) are collected into a machine learning architecture at step 616. This may include, for example, the processing device 502 collecting the machine learning model 102 and any other selected machine learning model that retained its backbone, the bridge(s) 126, **126*a*-126*c*, and the head(s) 120 of the machine learning model 104 and any other non-selected machine learning model that did not retain its backbone into a suitable package. The machine learning architecture can be stored, output, or used in some manner at step 618. This may include, for example, the processing device 502 deploying the package or other machine learning architecture to one or more end-user devices or other devices for use. This may also or alternatively include the processing device 502** using the package or other machine learning architecture to perform data processing.

Although FIG. 6 illustrates one example of a method 600 for machine learning model grafting and integration, various changes may be made to FIG. 6. For example, while shown as a series of steps, various steps in FIG. 6 may overlap, occur in parallel, occur in a different order, or occur any number of times.

Figure 7:
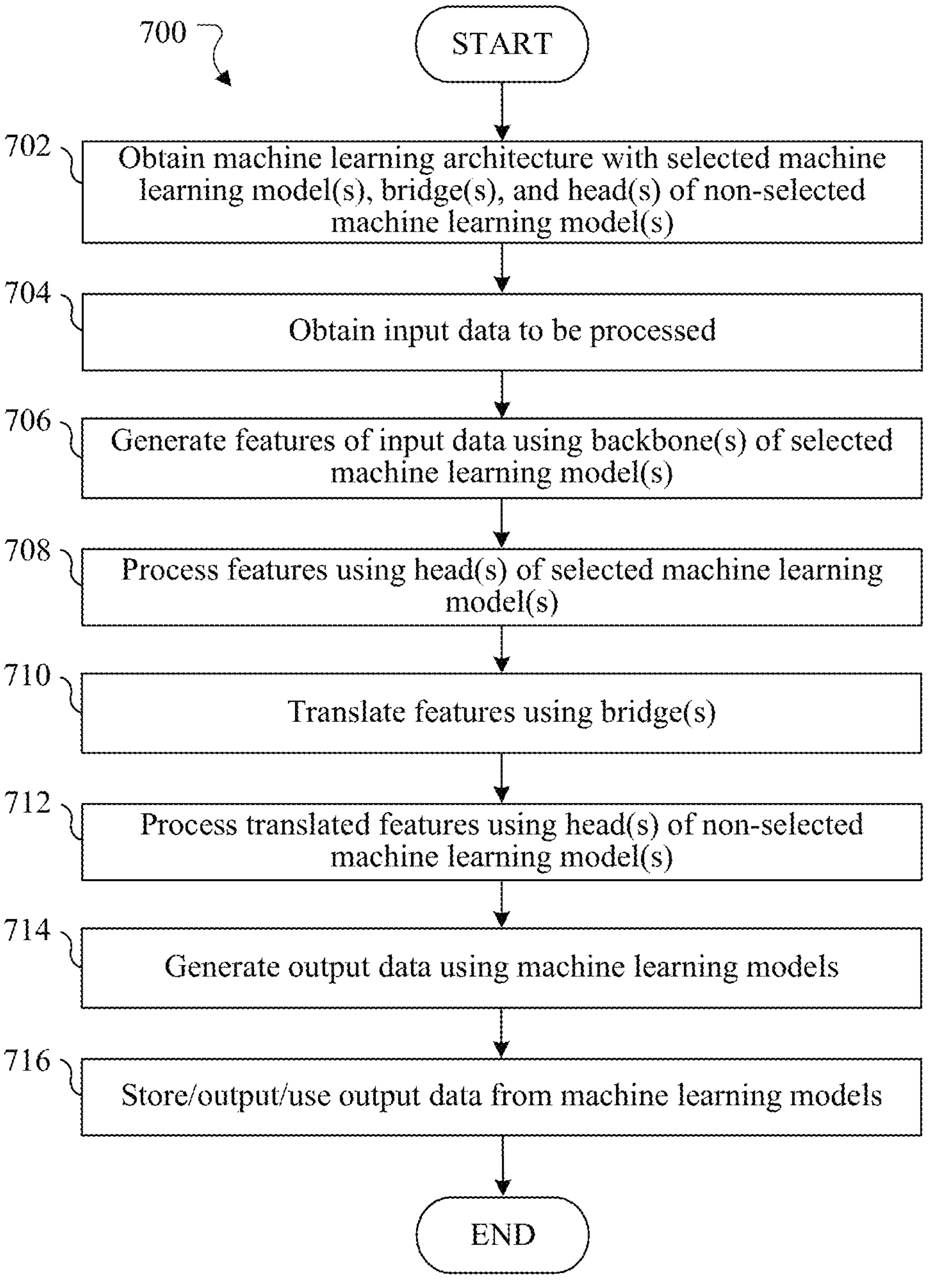
FIG. 7 illustrates an example method for using grafted and integrated machine learning models according to this disclosure.

FIG. 7 illustrates an example method 700 for using grafted and integrated machine learning models according to this disclosure. For ease of explanation, the method 700 is described as being performed using one or more instances of the device 500 shown in FIG. 5, which may use the architecture 100 or 200 shown in FIG. 1 or 2 to perform data processing. However, the method 700 may be performed using any other suitable device(s), and the method 700 may involve the use of any other suitable machine learning model architecture designed in accordance with this disclosure.

As shown in FIG. 7, a machine learning architecture including at least one selected machine learning model (which has its associated backbone), at least one bridge, and at least one head of at least one non-selected machine learning model (which lacks its associated backbone) is obtained at step 702. This may include, for example, the processing device 502 obtaining a package or other collection that includes the machine learning model 102 and any other selected machine learning model that retained its backbone, the bridge(s) 126, **126*a*-126*c*, and the head(s) 120 of the machine learning model 104 and any other non-selected machine learning model that did not retain its backbone. In some cases, the processing device 502 may generate the machine learning architecture. In other cases, the processing device 502 may obtain the processing device 502** from an external source.

Input data to be processed is obtained at step 704. This may include, for example, the processing device 502 obtaining image data, audio data, or other input data 106 to be processed using the machine learning architecture. Features are generated using the input data by the backbone(s) of the selected machine learning model(s) in the machine learning architecture at step 706. This may include, for example, the processing device 502 using the backbone 108 of the machine learning model 102 to produce extracted features 112 based on the input data 106. The features are processed using the head(s) of the selected machine learning model(s) at step 708. This may include, for example, the processing device 502 providing the extracted features 112 to the head 110 of the machine learning model 102 for detection, classification, or other processing.

The features are translated using the bridge(s) of the machine learning architecture at step 710. This may include, for example, the processing device 502 using the bridges 126, **126*a*-126*c* to translate the extracted features 112 from the feature space(s) of the selected machine learning model (s) to the feature space(s) of the non-selected machine learning model(s). The translated features are processed using the head(s) of the non-selected machine learning model(s) at step 712. This may include, for example, the processing device 502 providing a translated version of the extracted features 112 as the extracted features 122 to the head 120 of the machine learning model 104** for detection, classification, or other processing.

Output data is generated using the machine learning models at step 714. This may include, for example, the processing device 502 generating output data 116 using the machine learning model 102 and any other selected machine learning model(s), as well as generating output data 124 using the machine learning model 104 and any other non-selected machine learning model(s). The output data can be stored, output, or used in some manner at step 716. This may include, for example, the processing device 502 using the output data 116, 124 to perform a desired function related to image processing, audio processing, or any other suitable processing based on the output data 116, 124 generated using the machine learning models.

Although FIG. 7 illustrates one example of a method 700 for using grafted and integrated machine learning models, various changes may be made to FIG. 7. For example, while shown as a series of steps, various steps in FIG. 7 may overlap, occur in parallel, occur in a different order, or occur any number of times.

The following describes example embodiments of this disclosure that implement or relate to machine learning model grafting and integration. However, other embodiments may be used in accordance with the teachings of this disclosure.

In a first embodiment, a method includes obtaining multiple machine learning models, where each machine learning model includes a backbone and a head. The method also includes selecting a first of the machine learning models to retain its backbone. The method further includes back-propagating error terms for synthetic activation data through at least a portion of the backbone of a second of the machine learning models to generate an inception basis set. In addition, the method includes configuring a bridge using the inception basis set, where the bridge is configured to translate features generated by the backbone of the first machine learning model into features for use by the head of the second machine learning model.

In a second embodiment, an apparatus includes at least one memory configured to store multiple machine learning models, where each machine learning model includes a backbone and a head. The apparatus also includes at least one processing device configured to select a first of the machine learning models to retain its backbone. The one processing device is also configured to back-propagate error terms for synthetic activation data through at least a portion of the backbone of a second of the machine learning models to generate an inception basis set. The one processing device is further configured to configure a bridge using the inception basis set. The bridge is configured to translate features generated by the backbone of the first machine learning model into features for use by the head of the second machine learning model.

Any single one or any suitable combination of the following features may be used with the first or second embodiment. The backbone and the head of the first machine learning model, the bridge, and the head of the second machine learning model may be collected into a machine learning architecture, and the backbone of the second machine learning model from the machine learning architecture may be omitted. The machine learning architecture may be stored, output, or used. Additional error terms for additional synthetic activation data may be back-propagated through at least a portion of the backbone of a third of the machine learning models to generate an additional inception basis set, and a second bridge may be configured using the additional inception basis set. The second bridge may be configured to translate the features generated by the backbone of the first machine learning model into features for use by the head of the third machine learning model. The machine learning architecture may further include the second bridge and the head of the third machine learning model, and the backbone of the third machine learning model may be omitted. The bridge may be configured by training the bridge to translate the features generated by the backbone of the first machine learning model into the features for use by the head of the second machine learning model. The bridge may be trained without using training data associated with training of the second machine learning model. When the first and second machine learning models were trained using training data from similar environments, error terms for target outputs of the inception basis set may be back-propagated through a lesser number of layers of the backbone of the first machine learning model. When the first and second machine learning models were trained using training data from dissimilar environments, the error terms for the target outputs of the inception basis set may be back-propagated through a greater number of layers of the backbone of the first machine learning model.

In a third embodiment, a method includes obtaining a machine learning architecture having a backbone and a head of a first machine learning model, a bridge, and a head of a second machine learning model, where the machine learning architecture lacks a backbone of the second machine learning model. The method also includes providing input data to the backbone of the first machine learning model and generating extracted features based on the input data using the backbone of the first machine learning model. The method further includes processing the extracted features using the head of the first machine learning model. In addition, the method includes translating the extracted features using the bridge to generate translated features and processing the translated features using the head of the second machine learning model.

In a fourth embodiment, an apparatus includes at least one memory configured to store a machine learning architecture having a backbone and a head of a first machine learning model, a bridge, and a head of a second machine learning model, where the machine learning architecture lacks a backbone of the second machine learning model. The apparatus also includes at least one processing device configured to provide input data to the backbone of the first machine learning model. The at least one processing device is also configured to generate extracted features based on the input data using the backbone of the first machine learning model and process the extracted features using the head of the first machine learning model. The at least one processing device is further configured to translate the extracted features using the bridge to generate translated features and process the translated features using the head of the second machine learning model.

Any single one or any suitable combination of the following features may be used with the third or fourth embodiment. The machine learning architecture may further include a second bridge and a head of a third machine learning, and the machine learning architecture may lack a backbone of the third machine learning model. The extracted features may be translated using the second bridge to generate second translated features, and the second translated features may be processed using the head of the third machine learning model. The bridge may be configured to translate between a first feature space associated with the first machine learning model and a second feature space associated with the second machine learning model, and the second feature space may represent a transformed version of the first feature space. The first machine learning model may be selected to retain its backbone, error terms for synthetic activation data may be back-propagated through at least a portion of the backbone of the second machine learning model to generate an inception basis set, and the bridge may be configured based on the inception basis set. The bridge may be configured by training the bridge to translate the extracted features and generate the translated features, and the bridge may be trained without using training data associated with training of the second machine learning model.

In other embodiments, a non-transitory machine readable medium may include instructions that when executed cause at least one processor to perform the method of the first embodiment, which may include its associated feature(s). In still other embodiments, a non-transitory machine readable medium may include instructions that when executed cause at least one processor to perform the method of the third embodiment, which may include its associated feature(s).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

obtaining multiple machine learning models, each machine learning model comprising a backbone and a head;

selecting a first of the machine learning models to retain the backbone of the first machine learning model;

back-propagating error terms for synthetic activation data through at least a portion of the backbone of a second of the machine learning models to generate an inception basis set;

training a bridge for use between the first and second machine learning models using the inception basis set, the bridge configured by the training to translate features generated by the backbone of the first machine learning model into translated features for use by the head of the second machine learning model; and one of:

when the first and second machine learning models were trained using training data from similar environments that include similar feature spaces, back-propagating error terms for target outputs of the inception basis set through a lesser number of layers of the backbone of the first machine learning model; and when the first and second machine learning models were trained using training data from dissimilar environments that include dissimilar feature spaces, back-propagating the error terms for the target outputs of the inception basis set through a greater number of layers of the backbone of the first machine learning model.

2. The method of claim 1, further comprising:

collecting the backbone and the head of the first machine learning model, the bridge, and the head of the second machine learning model into a machine learning architecture while omitting the backbone of the second machine learning model from the machine learning architecture; and storing, outputting, or using the machine learning architecture.

3. The method of claim 2, further comprising:

back-propagating additional error terms for additional synthetic activation data through at least a portion of the backbone of a third of the machine learning models to generate an additional inception basis set; and training a second bridge using the additional inception basis set, the second bridge configured by the training to translate the features generated by the backbone of the first machine learning model into additional translated features for use by the head of the third machine learning model;

wherein the machine learning architecture further includes the second bridge and the head of the third machine learning model while omitting the backbone of the third machine learning model.

4. The method of claim 1, wherein the bridge is trained without using training data associated with training of the second machine learning model.

5. The method of claim 1, wherein the bridge comprises a nonlinear neural layer or a series of nonlinear neural network layers.

6. An apparatus comprising:

at least one memory configured to store multiple machine learning models, each machine learning model comprising a backbone and a head; and at least one processing device configured to:

select a first of the machine learning models to retain the backbone of the first machine learning model;

back-propagate error terms for synthetic activation data through at least a portion of the backbone of a second of the machine learning models to generate an inception basis set;

train a bridge for use between the first and second machine learning models using the inception basis set, the bridge configured by the training to translate features generated by the backbone of the first machine learning model into translated features for use by the head of the second machine learning model;

when the first and second machine learning models were trained using training data from similar environments that include similar feature spaces, back-propagate error terms for target outputs of the inception basis set through a lesser number of layers of the backbone of the first machine learning model; and when the first and second machine learning models were trained using training data from dissimilar environments that include dissimilar feature spaces, back-propagate the error terms for the target outputs of the inception basis set through a greater number of layers of the backbone of the first machine learning model.

7. The apparatus of claim 6, wherein the at least one processing device is further configured to:

collect the backbone and the head of the first machine learning model, the bridge, and the head of the second machine learning model into a machine learning architecture and omit the backbone of the second machine learning model from the machine learning architecture; and store, output, or use the machine learning architecture.

8. The apparatus of claim 7, wherein the at least one processing device is further configured to:

back-propagate additional error terms for additional synthetic activation data through at least a portion of the backbone of a third of the machine learning models to generate an additional inception basis set; and train a second bridge using the additional inception basis set, the second bridge configured by the training to translate the features generated by the backbone of the first machine learning model into additional translated features for use by the head of the third machine learning model; and wherein the machine learning architecture further includes the second bridge and the head of the third machine learning model and omits the backbone of the third machine learning model.

9. The apparatus of claim 6, wherein the at least one processing device is configured to train the bridge without using training data associated with training of the second machine learning model.

10. The apparatus of claim 6, wherein the bridge comprises a nonlinear neural layer or a series of nonlinear neural network layers.

11. A method comprising:

obtaining a machine learning architecture comprising a backbone and a head of a first machine learning model, a bridge, and a head of a second machine learning model;

providing input data to the backbone of the first machine learning model;

generating extracted features based on the input data using the backbone of the first machine learning model;

processing the extracted features using the head of the first machine learning model;

translating the extracted features using the bridge to generate translated features; and processing the translated features using the head of the second machine learning model;

wherein the machine learning architecture is generated by:

selecting the first machine learning model to retain the backbone of the first machine learning model;

back-propagating error terms for synthetic activation data through at least a portion of a backbone of the second machine learning model to generate an inception basis set;

configuring the bridge based on the inception basis set; and one of:

when the first and second machine learning models were trained using training data from similar environments that include similar feature spaces, back-propagating error terms for target outputs of the inception basis set through a lesser number of layers of the backbone of the first machine learning model; and when the first and second machine learning models were trained using training data from dissimilar environments that include dissimilar feature spaces, back-propagating the error terms for the target outputs of the inception basis set through a greater number of layers of the backbone of the first machine learning model.

12. The method of claim 11, wherein:

the machine learning architecture further comprises a second bridge and a head of a third machine learning, the machine learning architecture lacking a backbone of the third machine learning model; and the method further comprises:

translating the extracted features using the second bridge to generate second translated features; and processing the second translated features using the head of the third machine learning model.

13. The method of claim 11, wherein the bridge is configured to translate between a first feature space associated with the first machine learning model and a second feature space associated with the second machine learning model, the second feature space representing a transformed version of the first feature space.

14. The method of claim 11, wherein the bridge comprises a nonlinear neural layer or a series of nonlinear neural network layers.

15. The method of claim 11, wherein:

configuring the bridge comprises training the bridge to translate the extracted features and generate the translated features; and the bridge is trained without using training data associated with training of the second machine learning model.

16. An apparatus comprising:

at least one memory configured to store a machine learning architecture comprising a backbone and a head of a first machine learning model, a bridge, and a head of a second machine learning model; and at least one processing device configured to:

provide input data to the backbone of the first machine learning model;

generate extracted features based on the input data using the backbone of the first machine learning model;

process the extracted features using the head of the first machine learning model;

translate the extracted features using the bridge to generate translated features; and process the translated features using the head of the second machine learning model;

wherein the machine learning architecture is generated by:

selecting the first machine learning model to retain the backbone of the first machine learning model;

back-propagating error terms for synthetic activation data through at least a portion of a backbone of the second machine learning model to generate an inception basis set;

configuring the bridge based on the inception basis set; and one of:

when the first and second machine learning models were trained using training data from similar environments that include similar feature spaces, back-propagating error terms for target outputs of the inception basis set through a lesser number of layers of the backbone of the first machine learning model; and when the first and second machine learning models were trained using training data from dissimilar environments that include dissimilar feature spaces, back-propagating the error terms for the target outputs of the inception basis set through a greater number of layers of the backbone of the first machine learning model.

17. The apparatus of claim 16, wherein:

the machine learning architecture further comprises a second bridge and a head of a third machine learning, the machine learning architecture lacking a backbone of the third machine learning model; and the at least one processing device is further configured to:

translate the extracted features using the second bridge to generate second translated features; and process the second translated features using the head of the third machine learning model.

18. The apparatus of claim 16, wherein the bridge is configured to translate between a first feature space associated with the first machine learning model and a second feature space associated with the second machine learning model, the second feature space representing a transformed version of the first feature space.

19. The apparatus of claim 16, wherein the bridge comprises a nonlinear neural layer or a series of nonlinear neural network layers.

20. The apparatus of claim 16, wherein:

to configure the bridge, the at least one processing device is configured to train the bridge to translate the extracted features and generate the translated features; and the at least one processing device is configured to train the bridge without using training data associated with training of the second machine learning model.

* * * * *